United States Patent [19]

Swan

[11] 4,425,222
[45] Jan. 10, 1984

[54] CATALYTIC REFORMING PROCESS

[75] Inventor: George A. Swan, Baton Rouge, La.

[73] Assignee: Exxon Research and Engineering Co., Florham Park, N.J.

[21] Appl. No.: 482,512

[22] Filed: Apr. 6, 1983

Related U.S. Application Data

[63] Continuation-in-part of Ser. No. 468,154, Feb. 22, 1983, abandoned, which is a continuation-in-part of Ser. No. 271,528, Jun. 8, 1981, abandoned.

[51] Int. Cl.$^3$ .............................................. C10G 35/06
[52] U.S. Cl. ...................................... 208/65; 208/64; 208/138; 208/139
[58] Field of Search .................... 208/64, 65, 138, 139

[56] References Cited

U.S. PATENT DOCUMENTS

| | | | |
|---|---|---|---|
| 3,415,737 | 12/1968 | Kluksdahl | 208/138 |
| 3,516,924 | 6/1970 | Forbes | 208/65 |
| 3,544,451 | 12/1970 | Mitsche et al. | 208/138 |
| 3,660,271 | 5/1972 | Keith et al. | 208/65 |
| 3,705,094 | 12/1972 | Keith et al. | 208/65 |
| 3,943,050 | 3/1976 | Bertolacini | 208/65 |
| 4,155,834 | 5/1979 | Gallagher | 208/65 |
| 4,167,473 | 9/1979 | Sikonia | 208/64 |
| 4,174,270 | 11/1979 | Mayes | 208/64 |
| 4,356,081 | 10/1982 | Gallagher et al. | 208/139 |

FOREIGN PATENT DOCUMENTS 27384 4/1981 European Pat. Off. .

Primary Examiner—Curtis R. Davis
Attorney, Agent, or Firm—Llewellyn A. Proctor

[57] ABSTRACT

A process wherein, in a series of reforming zones, or onstream reactors, each of which contains a bed, or beds of catalyst, the catalyst in the leading reforming zones is constituted of supported platinum and a relatively low concentration of rhenium, and the catalyst in the last reforming zone, or reactor of the series, is constituted of platinum and a relatively high concentration of rhenium, and a swing reactor, also containing a supported platinum and rhenium catalyst, is manifolded so that it can be substituted for any one of the onstream reactors of the unit. The entry side, or upper portion of the swing reactor contains a catalyst constituted of platinum and a relatively low concentration of rhenium, and the exit side, or lower portion of the reactor contains a catalyst constituted of platinum and a relatively high concentration of rhenium. The amount of rhenium relative to the platinum on the catalyst in the last reactor and lower portion of the swing reactor is present in a weight ratio of rhenium:platinum of at least 1.5:1; preferably at least about 2:1, and more preferably ranges from about 2:1 to about 3:1. The amount of rhenium relative to the platinum on the catalyst in the lead reactors and upper portion of the swing reactor is present in a weight ratio of rhenium:platinum of up to about 1.2:1. The beds of catalyst in the several reactors are serially contacted with a hydrocarbon or naphtha feed, and hydrogen, at reforming conditions the feed flowing from one reactor of the series to the next, and serially through the upper and lower beds of the swing reactor, to produce a hydrocarbon, or naphtha product of improved octane, and the product is withdrawn.

19 Claims, 1 Drawing Figure

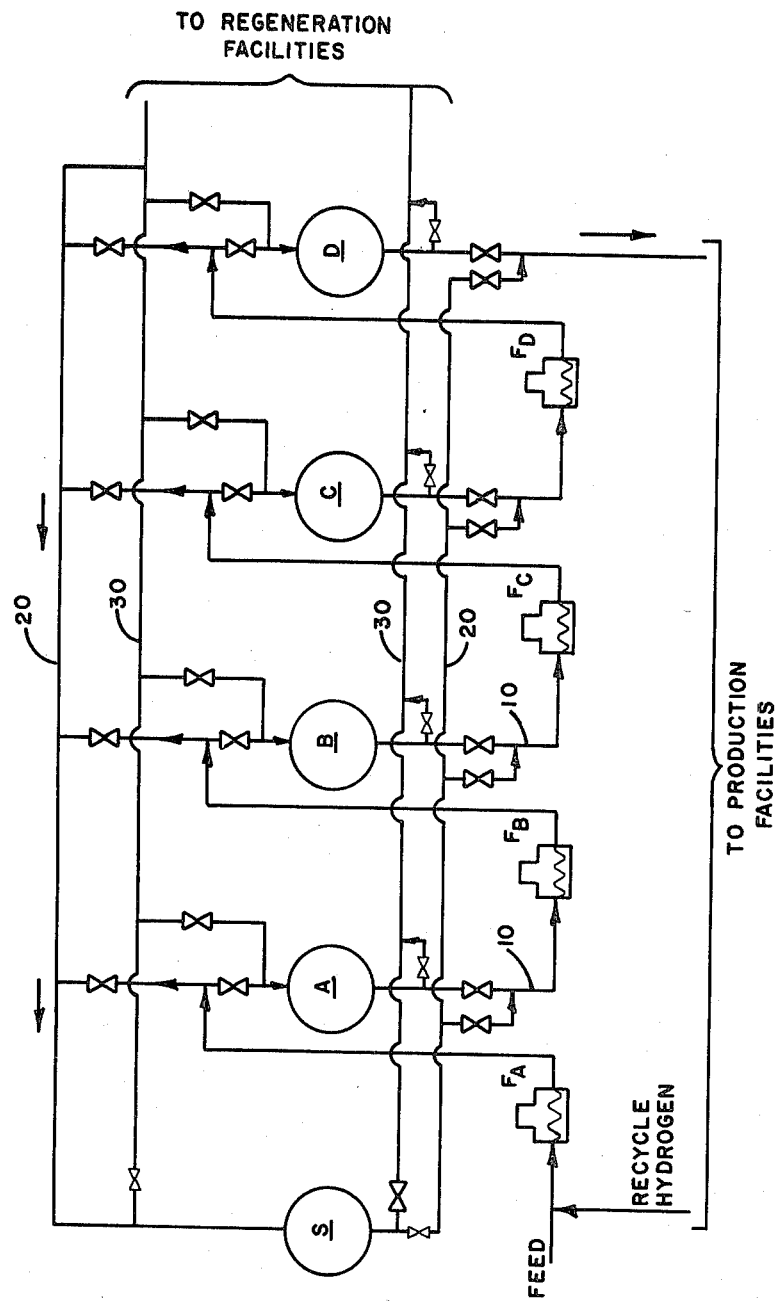

CATALYTIC REFORMING PROCESS

RELATED APPLICATIONS

This is a continuation-in-part of application Ser. No. 468,154, filed Feb. 22, 1983, which in turn is a continuation-in-part of application Ser. No. 271,528, filed June 8, 1981, both of which are now abandoned.

BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

Platinum has been widely commercially used in recent years in the production of reforming catalysts, and platinum-on-alumina catalysts have been commercially employed in refineries for the last few decades. In the last decade, additional metallic components have been added to platinum as promoters to further improve the activity or selectivity, or both, of the basic platinum catalyst, e.g., iridium, rhenium, tin, and the like. Some catalysts possess superior activity, or selectivity, or both, as contrasted with other catalysts. Platinum-rhenium catalysts by way of example possess admirable selectivity as contrasted with platinum catalysts, selectivity being defined as the ability of the catalyst to produce high yields of $C_5+$ liquid products with concurrent low production of normally gaseous hydrocarbons, i.e., methane and other gaseous hydrocarbons, and coke.

In a conventional process, a series of reactors constitute the heart of the reforming unit. Each reforming reactor is generally provided with a fixed bed, or beds, of the catalyst which receive upflow or downflow feed, and each is provided with a heater, because the reactions which take place are endothermic. A naphtha feed, with hydrogen, or hydrogen recycle gas, is cocurrently passed through a preheat furnace and then, usually downwardly, through a reactor, and then in sequence through subsequent interstage heaters and reactors of the series. The product from the last reactor is separated into a liquid fraction, and a vaporous effluent. The latter is a gas rich in hydrogen, and usually contains small amounts of normally gaseous hydrocarbons, from which hydrogen is separated from the $C_5+$ liquid product and recycled to the process to minimize coke production.

The activity of the catalyst gradually declines due to the build-up of coke. Coke formation is believed to result from the deposition of coke precursors such as anthracene, coronene, ovalene, and other condensed ring aromatic molecules on the catalyst, these polymerizing to form coke. During operation, the temperature of the process is gradually raised to compensate for the activity loss caused by the coke deposition. Eventually, however, economics dictate the necessity of reactivating the catalyst. Consequently, in all processes of this type the catalyst must necessarily be periodically regenerated by burning the coke off the catalyst at controlled conditions, this constituting an initial phase of catalyst reactivation.

Two major types of reforming are generally practiced in the multi reactor units, both of which necessitate periodic reactivation of the catalyst, the initial sequence of which requires regeneration, i.e., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst caused by the coke deposition, until finally the entire unit is shut down for regeneration, and reactivation, of the catalyst. In the second, or cyclic type of process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series.

Various improvements have been made in such processes to improve the performance of reforming catalysts in order to reduce capital investment or improve $C_5+$ liquid yields while improving the octane quality of naphthas and straight run gasolines. New catalysts have been developed, old catalysts have been modified, and process conditions have been altered in attempts to optimize the catalytic contribution of each charge of catalyst relative to a selected performance objective. Nonetheless, while any good commercial reforming catalyst must possess good activity, activity maintenance and selectivity to some degree, no catalyst can possess even one, much less all of these properties to the ultimate degree. Thus, one catalyst may possess relatively high activity, and relatively low selectivity and vice versa. Another may possess good selectivity, but its selectivity may be relatively low as regards another catalyst. Platinum-rhenium catalysts, among the handful of successful commercially known catalysts, maintain a rank of eminence as regards their selectivity; and they have good activity. Nonetheless, the existing world-wide shortage in the supply of high octane naphtha persists and there is little likelihood that this shortage will soon be in balance with demand. Consequently, a relatively small increase in the $C_5+$ liquid yield can represent a large credit in a commercial reforming operation.

Variations have been made in the amount, and kind of catalysts charged to the different reforming reactors of a series to modify or change the nature of the product, or to improve $C_5+$ liquid yield.

A response to this demand embodies a process described in said application Ser. No. 082,805, supra, wherein, in a series of reforming zones, or reactors, each of which contains a bed, or beds of catalyst, the catalyst in the leading reforming zones is constituted of supported platinum and a relatively low concentration of rhenium, and in the last reforming zone, or reactor of the series, the catalyst is constituted of platinum and a relatively high concentration of rhenium. The amount of rhenium relative to the platinum in the catalyst contained in the last reforming zone, or reactor, is in fact present in an atomic ratio of rhenium:platinum of at least about 1.5:1 and higher, and preferably the atomic ratio of rhenium:platinum ranges at least about 2:1, and higher, and more preferably from about 2:1 to about 3:1. The leading reforming zones, or reactors of the series, are provided with platinum-rhenium catalysts wherein the atomic ratio of the rhenium:platinum ranges from about 0.1:1 to about 1:1, preferably from about 0.3:1 to about 1:1. In carrying out the operation, the beds of catalyst are contacted with a hydrocarbon or naphtha feed, and hydrogen, at reforming conditions to produce a hydrocarbon, or naphtha product of improved octane, and the product is withdrawn. A further modification of this process is disclosed in pending application Ser. No. 082,804 by Swan, filed on even date with application Ser. No. 082,805.

It is known that the amount of coke produced in an operating run increases progressively from a leading reactor to a subsequent reactor, or from the first reactor to the last, or tail reactor of the series as a consequence of the different types of reactions that predominate in the several different reactors. Thus, in the first reactor of the series the metal site, or hydrogenation-dehydrogenation component of the catalyst, plays a dominant role and the predominant reaction involves the dehydrogenation of naphthenes to aromatics. This reaction proceeds at relatively low temperature, and the coke formation is relatively low. In the intermediate reactor (usually a second and third reactor), on the other hand, the acid site plays an important role in isomerizing paraffins and naphthenes, and the additional naphthenes are dehydrogenated to aromatics as in the first reactor. In both of the intermediate reactors the temperature is maintained higher than in the first reactor, and the temperature in the third reactor is maintained higher than that of the second reactor of the series. Carbon formation is higher in these reactors than in the first reactor of the series, and coke is higher in the third reactor than in the second reactor of the series. The chief reaction in the last reaction zone, or tail reactor of the series involves dehydrocyclization of paraffins, and the highest temperature is employed in this reactor. Coke formation is highest in this reactor, and the reaction is often the most difficult to control. It is also generally known that these increased levels of coke in the several reactors of the series causes considerable deactivation of the catalysts. Whereas the relationship between coke formation, and rhenium promotion to increase catalyst selectivity is not known with any degree of certainty because of the extreme complexity of these reactions, it is believed that the presence of the rhenium minimizes the adverse consequences of the increased coke levels, albeit it does not appear to minimize coke formation in any absolute sense. Nonetheless, in accordance with this invention, the concentration of the rhenium is increased in those reactors where coke formation is the greatest, but most particularly in the last reaction of the series. Thus, in one of its forms, the catalysts within the series of reactors are progressively staged with respect to the rhenium concentration, the rhenium concentration being increased from the first to the last reactor of the series such that the rhenium content of the platinum-rhenium catalysts is varied significantly to counteract the normal effects of coking.

In cyclic reforming, typically three or four reactors are arranged in series, and a swing reactor is manifolded in the unit such that it can occupy any position in the reactor train as reactors are taken out of service and the catalyst regenerated, and reactivated. Thus, in a typical catalyst regeneration, reactivation sequence in a reactor series, four reactors and a swing reactor, the swing reactor spends less than about twenty-five percent of the time in the first two reactor positions of the series, while in the remaining period the swing reactor occupies either the third or last reactor position. The last reactor of the series remains on oil about seventy percent of the time. In practicing the process wherein high rhenium is concentrated within the platinum-rhenium catalyst of the last reactor of the series, and staged in progressively higher concentration in the other reactors with highest rhenium concentration within the last reactor of the series, it may appear advantageous to substitute a high rhenium platinum-rhenium catalyst in a reactor occupying the last position of the series when this reactor is off oil for regeneration, and reactivation of the catalyst. However, placing a high rhenium platinum-rhenium catalyst in the swing reactor serves no useful purpose in the overall operation, and in fact results in significant $C_5+$ liquid yield loss when the swing reactor occupies the first two positions as is required in conventional operations.

It is, nonetheless, the primary object of the present invention to provide a new and further-improved process, particularly one which will provide enhanced $C_5+$ liquid yield, catalyst activity and catalyst activity maintenance credits.

A specific object is to provide a new and novel process for the operation of cyclic reforming units, notably one which will improve $C_5+$ liquid yield, catalyst activity and catalyst activity maintenance.

These objects and others are achieved in accordance with the present invention, embodying improvements in a process for reforming naphtha, with hydrogen, in a cyclic reforming unit which contains a plurality of platinum-rhenium catalysts containing on-stream reactors in series, and a platinum-rhenium catalyst-containing swing reactor manifolded therewith which can be periodically placed in series and substituted for an on-stream reactor while the latter is removed from series for regeneration and reactivation of the catalyst. The initial and intermediate on-stream reactors of the series each contain a bed, or beds, of catalyst constituted of supported platinum and a relatively low concentration of rhenium. The last on-stream reforming reactor of the series contains a catalyst constituted of platinum and a relatively high concentration of rhenium, and the swing reactor contains multiple beds of catalysts, generally an upper (or upstream) bed, or beds, which contains catalyst constituted of supported platinum and a relatively low concentration of rhenium and generally a lower (or downstream) bed, or beds, which contains catalyst constituted of supported platinum and a relatively high concentration of rhenium. Naphtha, and hydrogen, in the series are passed initially over the bed, or beds, of the swing reactor which contains the low rhenium, platinum-rhenium catalyst and then over the bed, or beds, of the swing reactor which contains the high rhenium, platinum-rhenium catalyst. Generally, the feed is passed downwardly to contact a bed, or beds, of low rhenium, platinum-rhenium catalyst, and thereafter it contacts a bed, or beds, of high rhenium, platinum-rhenium catalyst prior to exit from the swing reactor. Preferably, the amount of rhenium relative to the platinum in the last reforming reactor, and in the lower bed of the swing reactor, is present in a weight ratio of at least about 1.5:1 and higher, more preferably from about 2:1 to about 3:1. The amount of rhenium relative to the platinum on the catalysts in the initial and intermediate on-stream reactors of the series, and upper bed of the swing reactor, are provided with platinum-rhenium catalysts wherein the weight ratio of rhenium:platinum ranges from about 0.1:1 to about 1.2:1, preferably up to about 1:1. More preferably, the rhenium:platinum ratio of the catalyst ranges from about 0.3:1 to about 1.2:1, or 1:1, and most preferably from about 0.5:1 to about 1.2:1, or 1:1. The beds of catalyst in the several reactors, inclusive of the swing reactor are serially contacted with a hydrocarbon or naphtha feed, and hydrogen, at reforming conditions the feed flowing, generally downwardly, from one reactor of the series to the next, serially through the upper and lower beds of the swing reactor, to produce a hydrocarbon, or naphtha product of improved octane, and the product is withdrawn.

Staged system credits in selectivity, catalyst activity and catalyst activity maintenance are provided by the use of a swing reactor containing an upper fixed bed of platinum-rhenium catalyst having a relatively low concentration of rhenium:platinum, and a lower fixed bed of platinum-rhenium catalyst having a relatively high concentration of rhenium:platinum. Suitably, the upper bed of the reactor contains from about 50 to about 90 percent, preferably from about 70 percent to about 85 percent of the catalyst, based on the weight of catalyst in the reactor; the balance of the catalyst (50 percent to 10 percent, preferably 30 percent to 15 percent) being contained in the lower bed, or beds, of the reactor. When the swing reactor is in the position of the first or second of the onstream reactors, the endotherm is sufficient to minimize cracking reactions in the lower zone of the reactor, thereby suppressing $C_5^+$ liquid yield loss. On the other hand, in the last and second to last onstream positions, the high concentration of rhenium in the lower bed, or beds, is beneficial in improving coke tolerance at the elevated temperatures.

These features and others will be better understood by reference to the following more detailed description of the invention, and to the drawing to which reference is made.

In the drawing:

The FIGURE depicts, by means of a simplified flow diagram, a preferred cyclic reforming unit inclusive of multiple onstream reactors, and an alternate or swing reactor inclusive of manifolds for use with catalyst regeneration and reactivation equipment (not shown).

Referring generally to the FIGURE, there is described a cyclic unit comprised of a multi-reactor system, inclusive of onstream Reactors A, B, C, D and a swing Reactor S, and a manifold useful with a facility for periodic regeneration and reactivation of the catalyst of any given reactor, swing Reactor S being manifolded to Reactors, A, B, C, D so that it can serve as a substitute reactor for purposes of regeneration and reactivation of the catalyst of a reactor taken offstream. The several reactors of the series A, B, C, D are arranged so that while one reactor is offstream for regeneration and reactivation of the catalyst, the swing Reactor S can replace it and provision is also made for regeneration and reactivation of the catalyst of the swing reactor.

In particular, the onstream Reactors A, B, C, D, each of which is provided with a separate furnace or heater $F_A$, or reheater $F_B, F_C, F_D$, respectively, are connected in series via an arrangement of connecting process piping and valves so that feed can be passed in seratim through $F_A A$, $F_B B$, $F_C C$, $F_D D$, respectively; or generally similar grouping wherein any of Reactors A, B, C, D are replaced by Reactor S. This arrangement of piping and valves is designated by the numeral 10. Any one of the onstream Reactors A, B, C, D, respectively, can be substituted by swing Reactor S as when the catalyst of any one of the former requires regeneration and reactivation. This is accomplished in "paralleling" the swing reactor with the reactor to be removed from the circuit for regeneration by opening the valves on each side of a given reactor which connect to the upper and lower lines of swing header 20, and then closing off the valves in line 10 on both sides of said reactor so that fluid enters and exits from said swing Reactor S. Regeneration facilities, not shown, are manifolded to each of the several Reactors A, B, C, D, S through a parallel circuit of connecting piping and valves which form the upper and lower lines of regeneration header 30, and any one of the several reactors can be individually isolated from the other reactors of the unit and the catalyst thereof regenerated and reactivated.

In conventional practice the reactor regeneration sequence is practiced in the order which will optimize the efficiency of the catalyst based on a consideration of the amount of coke deposited on the catalyst of the different reactors during the operation. Coke deposits much more rapidly on the catalyst of Reactors C, D and S than on the catalyst of Reactors A and B and, accordingly, the catalysts of the former are regenerated, and reactivated at greater frequency than the latter. The reactor regenration sequence is characteristically in the order ACDS/BCDS, i.e., Reactors A, C, D, B, etc., respectively, are substituted in order by another reactor, typically swing Reactor S, and the catalyst thereof regenerated and reactivated while the other four reactors are left onstream.

With reference to the FIGURE, for purposes of illustrating a catalyst regeneration, reactivation sequence, it is assumed that all of Reactors, A, B, C, D and S were charged ab initio with fresh presulfided catalyst, and Reactors A, B, C, D then put onstream. The catalyst of each of the several Reactors A, B, C, D are then each removed from the unit as the catalyst is deactivated, the catalyst of each subsequently regenerated, and reactivated in conventional sequence, supra.

In conducting the reforming operations, substantially all or a major portion of the moisture is scrubbed, or adsorbed from the hydrogen recycle gas which is returned to the unit to maintain a dry system. The recycle gas of the system should be dried sufficiently such that it contains a maximum of about 50 parts, preferably 20 parts, per million parts of water.

The invention, and its principle of operation, will be more fully understood by reference to the following examples, and comparative data, which characterizes a preferred mode of operation. All parts are in terms of weight units except as otherwise specified.

EXAMPLES

In a first run, Reactors A, B, C, D and S were each charged with a commercially supplied catalyst which contained platinum and rhenium well dispersed upon the surface of a gamma alumina support. The catalyst, Catalyst X, was dried, calcined, and then sulfided by contact with an admixture of n-butyl mercaptan in hydrogen, the gas having been injected into the reactor to provide a catalyst (dry basis) of the following weight composition, to wit:

| Catalyst X | |
|---|---|
| Platinum | 0.3 wt. % |
| Rhenium | 0.3 wt. % |
| Chloride | 0.9 wt. % |
| Sulfur | 0.07 wt. % |
| Alumina | Balance wt. % |

In a second run, Reactors, A, B, and C were each then charged with a portion of Catalyst X. Reactor D, and the lower portion of Reactor S, were each then charged with a catalyst, Catalyst Y, similar in all respects to Catalyst X and similarly treated, except that Catalyst Y (dry basis) was of the following composition:

| Catalyst Y | |
|---|---|
| Platinum | 0.3 wt. % |
| Rhenium | 0.67 wt. % |
| Chloride | 1.1 wt. % |
| Sulfur | 0.15 wt. % |
| Alumina | Balance wt. % |

The upper portion of Reactor S, in the second run, was charged with a portion of Catalyst X, the catalyst charged to Reactors A, B, and C. The upper portion of Reactor S contained 70 wt. % of the total catalyst charge, and the lower portion of Reactor S contained 30 wt. % of the total catalyst charge to the reactor.

The catalyst type charged to each reactor and the fraction of the total catalyst charge, based on the weight of the total catalyst in all reactors, the catalyst regeneration time required for each reactor in its respective position, and the equivalent isothermal temperature (E.I.T.) in each of the runs is given in Table I.

TABLE I

| Reactor | Catalyst Type | Fraction Total Catalyst Charge | Regeneration Time | E.I.T. °F. |
|---|---|---|---|---|
| A (Runs 1 & 2) | X | 0.131 | 24 | 860 |
| B (Runs 1 & 2) | X | 0.217 | 24 | 917 |
| C (Runs 1 & 2) | X | 0.217 | 36 | 952 |
| D (Runs 1 & 2) | Y | 0.217 | 36 | 972 |
| S (Run 1) | X | 0.217 | 36 | function of position |
| S (Run 2) | 70% X/30% Y | 0.217 | 36 | function of position |

Reforming runs were then initiated, Reactors A, B, C, and D having been placed onstream with Reactor S in stand-by position, by adjusting the hydrogen and feed rates to the reactors, the feed being characterized as a naphtha blend which had, as shown in Table II, the following inspections:

TABLE II

| ASTM Distillation, °F. | |
|---|---|
| Initial | 166 |
| 5 | 203 |
| 10 | 214 |
| 20 | 227 |
| 30 | 239 |
| 40 | 253 |
| 50 | 269 |
| 60 | 283 |
| 70 | 299 |
| 80 | 315 |
| 90 | 333 |
| 95 | 346 |
| FBP | 358 |
| Octane No., RON Clear | 35.0 |
| Gravity °API | 58.9 |
| Sulfur, wppm | 0.5 |
| Analysis, Vol. Percent | |
| Paraffins | 66.3 |
| Naphthenes | 22.7 |
| Aromatics | 11.0 |

The temperature and pressure of the reactors in each run were then adjusted to the operating conditions required to produce a 100 RONC octane $C_5+$ liquid product, and the run was continued at generally optimum reforming conditions by adjustment of these and other major process variables to those given below:

| Major Operating Variables | Process Conditions |
|---|---|
| Pressure, psig | 175 |
| Reactor Temp., E.I.T. °F. | 950 |
| Recycle Gas Rate, SCF/B | 3000 |

The runs were continued until such time that sufficient coke had deposited on the catalyst of a reactor that regeneration, and reactivation of the catalyst of a given reactor was required. Each reactor of the series was periodically replaced in each run and the catalyst thereof regenerated, and reactivated for a time period as given in Table I. Reactors C and D, thus require 36 hours for regeneration and reactivation, whereas Reactors A and B require 24 hours. The regeneration in each instance was accomplished by burning the coke from the coked catalyst, initially by burning at 950° F. by the addition of a gas which contained 0.6 mole percent oxygen; and thereafter the temperature was maintained at 950° F. while the oxygen concentration in the gas was increased to 6 mole prercent. Reactivation in each instance was conducted by the steps of: (a) redispersing the agglomerated metals by contact of the catalyst with a gaseous admixture containing sufficient carbon tetrachloride to decompose in situ and deposit 0.1 wt. % chloride on the catalyst; (b) continuing to add a gaseous mixture containing 6% oxygen for a period of 2 to 4 hours while maintaining a temperature of 950° F.; (c) purging with nitrogen to remove essentially all traces of oxygen from the reactor; and (d) reducing the metals of the catalyst by contact with a hydrogen-containing gas at 850° F.

In each instance after a regeneration/reactivation sequence, the activation of the catalyst was completed by sulfiding the catalyst of all of Reactors A, B, C, D and S by direct contact with a gaseous admixture of n-butyl mercaptan in hydrogen, sufficient to deposit 0.001–0.1 wt. % sulfur on the catalyst.

Referring to Table III, there is tabulated a conventional reactor regeneration sequence ACDS/BCDS, inclusive of starting step "0" (Column 1) wherein all of Reactors A, B, C, and D are onstream and serially aligned, with swing Reactor S in standby, and eight additional steps. viz., steps 1 through 8, wherein Reactors A, C, D, S and B, C, D, S are replaced one by one with swing Reactor S. The fourth column of the table shows the time period each reactor remains offstream for regeneration, and reactivation; a total of 264 hours.

TABLE III

| | Reactors Onstream | Reactor Being Regenerated | Time Required for Regeneration, and Reactivation, Hours |
|---|---|---|---|
| 0 | A B C D | S | — |
| 1 | S B C D | A | 24 |
| 2 | A B S D | C | 36 |
| 3 | A B C S | D | 36 |
| 4 | A B C D | S | 36 |
| 5 | A S C D | B | 24 |
| 6 | A B S D | C | 36 |
| 7 | A B C S | D | 36 |
| 8 | A B C D | S | 36 |

Calculations show that in the cyclic reforming operation Reactor D is out of service for the required catalyst regeneration, and reactivation, 27% of the total time period. Conversely, Reactor D is in service 73% of the total time period. Optimum benefits, however, can be achieved only during the actual period when the high rhenium platinum-rhenium catalyst is fully utilized at the tail reactor position. This ideal condition, through it is not possible to achieve 100% of the time in a conventional cylic reforming operation, is represented in Table 4. Thus, ideally the use of the high rhenium platinum-rhenium catalyst in the tail reactor can provide a 15% activity credit and a 1.0% $C_5+$ liquid volume yield credit as contrasted with an operation which employs a conventional platinum-rhenium catalyst, or platinum-rhenium catalyst which contains a weight ratio of rhenium:platinum of 1:1 in all of the reactors of the unit.

In the normal cyclic reforming operation with the full benefits of the high rhenium platinum-rhenium catalyst utilized 73% of the period, and lost during the 27% of the period when a swing Reactor S containing a platinum-rhenium catalyst having a weight ratio of rhenium:platinum of 1:1 is swung on line, the overall advantage as shown by reference to Table IV is reduced to a 12% activity credit and an 0.8% $C_5+$ liquid volume yield credit.

In accordance with this invention however, as further shown by reference to Table IV, an activity credit of 14% and a 0.9% $C_5+$ liquid volume percent yield credit are obtained. These advantages result because the high rhenium platinum-rhenium catalyst is utilized more effectively, and to a greater extent of time in the D reactor position. In both the C and D reactor positions the high rhenium platinum-rhenium catalyst of swing Reactor S provides some advantages, even if maximum utilization is not possible. Moreover, the lower catalyst bed of swing Reactor S of the present invention takes advantage of the endotherm which normally occurs in the bottom portion of a reactor in the A and B positions, this preventing yield loss by cracking such as has been observed with high rhenium platinum-rhenium catalysts employed in lead reactor positions (i.e., swing reactor charged with 100% high rhenium platinum-rhenium catalysts).

TABLE IV

| | 950° F. Overall E.I.T.; 175 psig; 3000 SCF/B, 100 RON | |
|---|---|---|
| | Credits | |
| Case | Activity | $C_5+$ Yield |
| Ideal | +15% | +1.0 LV % |
| Normal Cyclic Operation | +12% | +0.8 LV % |
| This Invention | +14% | +0.9 LV % |

The present process, or process of this invention, thus affords a much closer approach to the ideal than possible in normal cyclic reforming reactions.

In one of its aspects, optimum utilization of rhenium-promoted platinum catalysts is obtained by providing the catalyst of the initial, or first reactor of the series with rhenium in concentration adequate to provide a weight ratio of rhenium:platinum ranging from about 0.1:1 to about 0.5:1, preferably from about 0.3:1 to about 0.5:1. The catalyst of the intermediate reforming zones, as represented by the reactors intermediate between the first and last reactors of the series, and the upper portion of the swing reactor are provided with rhenium in concentration adequate to provide a weight ratio of rhenium:platinum ranging from about 0.5:1 to about 1:1, preferably above about 0.5:1 to about 0.8:1. The last reactor of the series and lower portion of the swing reactor are provided with rhenium in concentration adequate to provide a weight ratio of rhenium:platinum ranging from about 1.5:1 to about 3:1, preferably from about 2:1 to about 3:1. The last reactor of a series, whether the series contains less than three or more than three reactors, and the lower portion of the swing reactor are always provided with a catalyst which contains a weight ratio of rhenium:platinum of at least about 1.5:1, and preferably contains a weight ratio of rhenium:platinum ranging from about 2:1 to about 3:1.

The catalyst employed in accordance with this invention is necessarily constituted of composite particles which contain, besides a carrier or support material, a hydrogenation-dehydrogenation component, or components, a halide component and, preferably, the catalyst is sulfided. The support material is constituted of a porous, refractory inorganic oxide, particularly alumina. The support can contain, e.g., one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m²/g, preferably from about 100 to about 300 m²/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The metal hydrogenation-dehydrogenation component can be composited with or otherwise intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other non-agglomerating atmosphere. The metal hydrogenation components can also be added to the catalyst by impregnation, typically via an "incipient wetness" technique which requires a minimum of solution so that the total solution is absorbed, initially or after some evaporation.

It is preferred to deposit the platinum and rhenium metals, and additional metals used as promoters, if any, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

Platinum in absolute amount is usually supported on the carrier within the range of from about 0.01 to 3 percent, preferably from about 0.05 to 1 percent, based on the weight of the catalyst (dry basis). Rhenium, in absolute amount, is also usually supported on the carrier in concentration ranging from about 0.1 to about 3 percent, preferably from about 0.5 to about 1 percent, based on the weight of the catalyst (dry basis). The absolute concentration of each, of course, is preselected to provide the desired atomic ratio of rhenium:platinum for a respective reactor of the unit, as heretofore expressed. In the tail reactor, and lower portion of the swing reactor, the rhenium is provided in major amount relative to the platinum whereas, in contrast, in all other reactors and upper portion of the swing reactor the rhenium is provided in minor amount, or no more than about an equal amount, relative to the platinum, based on the atomic ratio of these metals, one with respect to the other. In compositing the metals with the carrier, essentially any soluble compound can be used but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where, e.g., platinum is to be deposited on the carrier, platinum chloride, platinum nitrate, chloroplatinic acid, ammonium chloroplatinate, potassium chloroplatinate, platinum polyamine, platinum acetylacetonate, and the like, are preferably used. A promoter metal, or metal other than platinum and rhenium, when employed, is added in concentration ranging from about 0.01 to 3 percent, preferably from about 0.05 to about 1 percent, based on the weight ratio of the catalyst.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 0.9 to about 1.5 percent, based on the weight of the catalyst. When using chlorine as a halogen component, it is added to the catalyst within the range of about 0.2 to 2 percent, preferably within the range of about 1 to 1.5 percent, based on the weight of the catalyst. The introduction of halogen into catalyst can be carried out by any method at any time. It can be added to the catalyst during catalyst preparation, for example, prior to, following or simultaneously with the incorporation of the metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and at pressures ranging from about 1 to about 40 atmospheres for the time necessary to achieve breakthrough, or the desired sulfur level.

The feed or charge stock can be a virgin naphtha cracked naphtha, a naphtha from a coal liquefaction process, a Fischer-Tropsch naphtha, or the like. Such feeds can contain sulfur or nitrogen, or both, at fairly high levels. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C_{12}$, and from 10 through 80 vol. % of naphthenes falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, psig | 50–750 | 100–500 |
| Reactor Temp., °F. | 800–1200 | 850–1050 |
| Recycle Gas Rate, SCF/B | 1000–10,000 | 1500–5000 |
| Feed Rate, W/Hr/W | 0.5–10 | 1.0–5 |

It is apparent that various modifications and changes can be made without departing from the spirit and scope of the present invention, the outstanding feature of which is that the octane quality of various hydrocarbon feedstocks, inclusive particularly of paraffinic feedstocks, can be upgraded and improved.

Having described the invention, what is claimed is:

1. In a process for reforming, with hydrogen, in a cyclic reforming unit comprised of a plurality of serially connected onstream platinum-rhenium catalyst-containing reactors, inclusive of one or more lead reactors, a tail reactor, and a swing reactor which, due to an arrangement of process piping and valves comprising headers, can be substituted for any one of the onstream reactors while the latter is offstream for regeneration, and reactivation of the catalyst, the catalyst of the tail reactor containing a major concentration of rhenium relative to the concentration of the platinum, as contrasted with the concentrations of rhenium and platinum contained in the lead reactors, the weight ratio of rhenium:platinum on the catalyst in the tail reactor being maintained at least about 1.5:1, while the catalyst of the lead reactors contain a catalyst having a weight ratio of rhenium:platinum of up to about 1.2:1, the naphtha flowing in sequence from one reactor of the series to another and contacting the catalyst at reforming conditions, in the presence of hydrogen, the improvement comprising providing in the entry side of the swing reactor, a catalyst having a weight ratio of rhenium:platinum of up to about 1.2:1, and providing in the exit side of the swing reactor, a catalyst having a weight ratio of rhenium:platinum of at least about 1.5:1.

2. The process of claim 1 wherein the concentration of catalyst contained in the entry side of the swing reactor which contains a relatively low concentration of rhenium, relative to the platinum, ranges from about 50 percent to about 90 percent of the total catalyst charge in the swing reactor, based on the weight of catalyst in said reactor.

3. The process of claim 2 wherein the concentration of the catalyst contained in the entry side of the swing reactor ranges from about 70 percent to about 85 percent.

4. The process of claim 1 wherein the concentration of catalyst contained in the exit side of the swing reactor which contains a relatively high concentration of rhenium, relative to the platinum, ranges from about 50 to about 10 percent of the total catalyst charge, based on the weight of the catalyst in said reactor.

5. The process of claim 4 wherein the concentration of the catalyst contained in the exit side of the swing reactor ranges from about 30 percent to about 15 percent.

6. The process of claim 1 wherein the weight ratio of rhenium:platinum in the catalyst of the tail reactor and exit side of the swing reactor is at least about 2:1, and higher.

7. The process of claim 1 wherein the weight ratio of rhenium:platinum in the catalyst of the tail reactor and exit side of the swing reactor ranges from about 2:1 to about 3:1.

8. The process of claim 1 wherein the catalyst of the tail reactor and exit side of the swing reactor contains from about 0.01 to about 3 percent platinum.

9. The process of claim 8 wherein the catalyst of the tail reactor and exit side of the swing reactor contains from about 0.05 to about 1 percent platinum.

10. The process of claim 1 wherein the catalyst of the tail reactor and lower portion of the swing reactor contains from about 0.1 to about 3 percent rhenium.

11. The process of claim 10 wherein the catalyst of the tail reactor and lower portion of the swing reactor contains from about 0.5 to about 1 percent rhenium.

12. The process of claim 1 wherein the catalyst of the tail reactor and exit side of the swing reactor contains from about 0.01 to about 3 percent platinum, and sufficient rhenium to provide the expressed weight ratio of rhenium:platinum.

13. The process of claim 1 wherein the catalyst of the tail reactor and exit side of the swing reactor contains from about 0.1 to about 3 percent rhenium, and sufficient platinum to provide the expressed weight ratio of rhenium:platinum.

14. The process of claim 1 wherein the catalyst of the tail reactor and exit side of the swing reactor contains from about 0.1 to about 3 percent halogen.

15. The process of claim 14 wherein the catalyst of the tail reactor and exit side of the swing reactor contains from about 0.9 to about 1.5 percent halogen.

16. The process of claim 1 wherein the catalyst of the tail reactor and exit side of the swing reactor is sulfided, and contains to about 0.2 percent sulfur.

17. The process of claim 1 wherein the catalyst of the tail reactor and exit side of the swing reactor is sulfided, and contains from about 0.05 to about 0.15 percent sulfur.

18. The process of claim 1 wherein the weight ratio of rhenium:platinum in the catalyst of the lead reactors and entry side of the swing reactor ranges from about 0.01:1 to about 1.2:1.

19. The process of claim 1 wherein the weight ratio of rhenium:platinum in the catalyst of the lead reactors and entry side of the swing reactor ranges from about 0.3:1 to about 1.2:1.

* * * * *